Dec. 6, 1932.  G. A. MONTGOMERY  1,889,866
TUBULAR COUPLING
Filed June 24, 1929
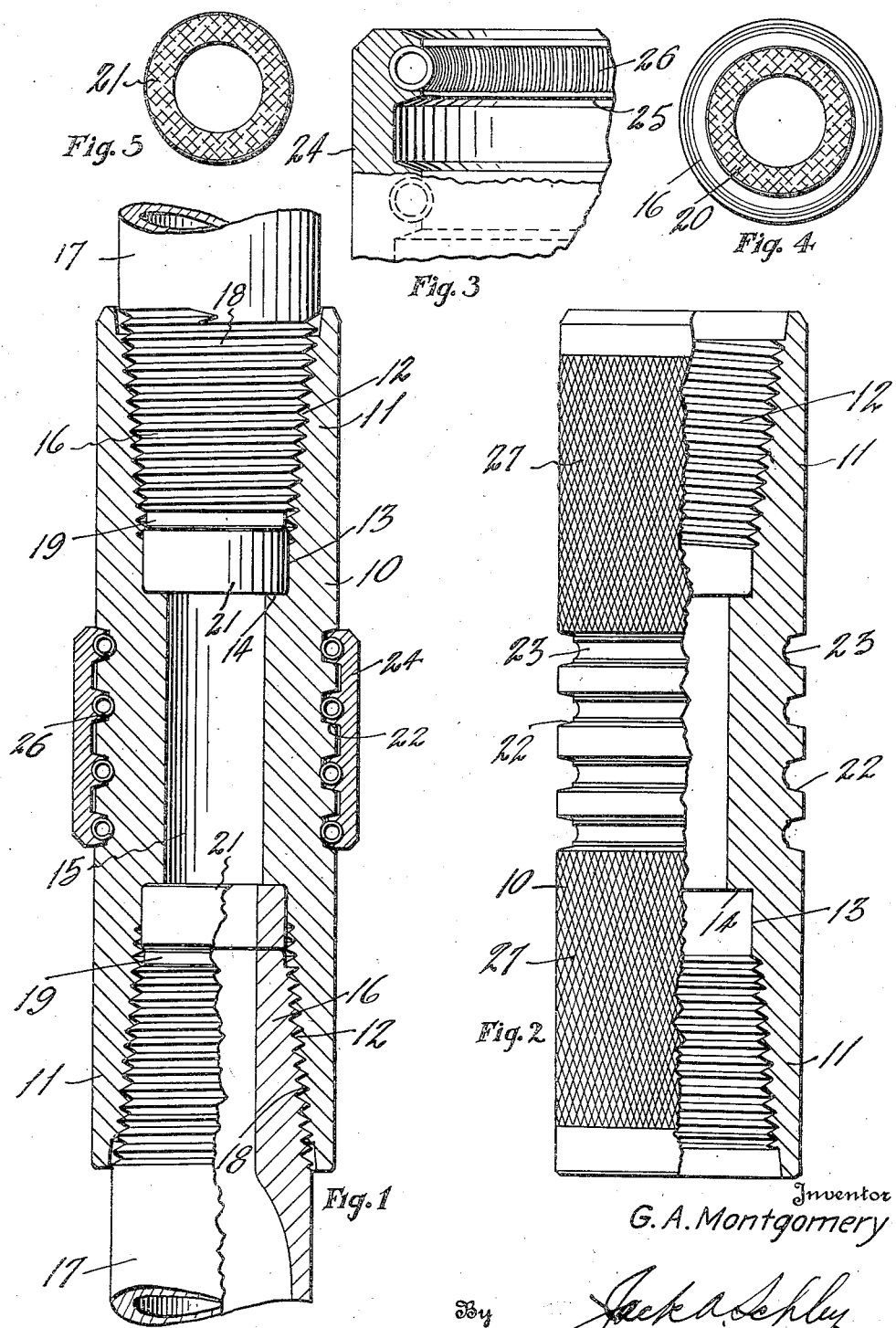
Inventor
G. A. Montgomery
By Jack A. Schley
Attorney Patented Dec. 6, 1932

1,889,866

UNITED STATES PATENT OFFICE

GUSTAVUS A. MONTGOMERY, OF DALLAS, TEXAS

TUBULAR COUPLING

Application filed June 24, 1929. Serial No. 373,355.

This invention relates to new and useful improvements in tubular couplings.

An object of the invention is to provide a non-metallic flexible protector ring or sleeve fitting about the coupling and arranged to cushion against the coupling and including means for preventing rotation on the coupling.

Another object of the invention is to provide a coupling with one or more tapering or V-shaped grooves so that the correspondingly shaped rib or ribs on a protector sleeve may exercise a wedge action, thus tending to tighten the sleeve and prevent its turning with reference to the coupling.

A further object of the invention is to supplement said ribs with embedded friction means, for example coiled springs, which by virtue of their roughened surfaces will tend to prevent slippage with reference to the bottoms of the grooves on which they bear.

A still further object of the invention is to provide a metallic coupling with a protector sleeve of yieldable material, said sleeve not only including grip formations but having embedded therein other structure combined therewith which will coact with said formations to prevent slippage of the sleeve in any direction.

A construction designed to carry out the invention will be hereinafter described together with other features of the invention.

The invention will be more readily understood from a reading of the following specification and by reference to the accompanying drawing in which an example of the invention is shown, and wherein:

Figure 1 is a vertical sectional view of a coupling constructed in accordance with the invention, Figure 2 is a view of the coupling member partly in elevation and partly in section, Figure 3 is a partial view of the flexible protector, Figure 4 is an end view of the pin of one of the pipes, and Figure 5 is a plan view of one of the stop rings.

In the drawing the numeral 10 designates an elongated coupling member having tapered boxes 11 at each end provided with internal screw threads 12. At the inner end or bottom of each box I provide a cylindrical socket or recess 13 having a shoulder 14. These sockets are connected by an axial bore 15 extending through the central portion of the sleeve.

Into the box 11 at each end of the coupling 10 is screwed a pin 16. Each pin 16 is formed on the upset end of a pipe or tube 17. Coarse threads 18 are provided on each pin and the pin is tapered so that the threads 18 will engage the threads 12. It will be noted that the pipes 17 do not have shoulders and the screwing of the pin into the box is not limited by shoulders on either the pin or the box.

Each pin has a reduced nipple 19 on its end which is free from threads and is provided with a flat transverse face 20 lying in a plane at right-angles to the longitudinal axis of said pin. This face which forms the end of the pin is preferably tempered to the required degree of hardness and is polished so as to form a thrust surface.

In each socket 13 a cylindrical stop ring 21 is pressed or otherwise tightly fitted so as to remain permanently in place, reference being made to the co-pending application of Gustavus A. Montgomery filed June 25, 1931, Serial No. 546,788, for claims directed to this and associated structure. The rings rest upon the shoulders 14 and become immovable within the coupling 10. The exposed ends of the rings are hardened and finished so as to receive the faces 20 of the pins, thus forming tight joints as well as locking the pins in the coupling.

The invention particularly covered by the instant application consists of providing the central area of the coupling 10 with circumferential V-shaped grooves 22 having concaved shouldered grooves 23 at their bottoms. A flexible non-metallic protector sleeve 24, formed of rubber or other suitable material, is provided with internal annular ribs 25 which are shaped to fit snugly in the grooves 22, but are larger in diameter so as not to contact with the bottoms of the grooves 22. In each rib a circular coiled spring 26 is embedded and partially exposed so as to engage in the grooves 23.

The sleeve extending beyond the surface of the coupling 10 will protect the latter and will also act as a guide in passing through a casing or other pipe, thereby reducing wear and also tending to lessen the power required to rotate a drill stem. The annular spaces left between the ribs and the bottoms of the grooves 22 assure a tight fit of the inclined ribs in said grooves and also provide air cushions within the protector. The inclination of said ribs causes them to wedge rather tightly in the correspondingly shaped grooves 22, it being noted that there also is a clearance between certain inner and outer walls of the sleeve 24 and coupling 10 to permit inward progression of the ribs. The coiled springs engaging in the grooves not only act as cushions but prevent rotation or creeping of the protector on the coupling 10. In this manner the coiled springs augment the ribs 25 which, it will be understood from what has been said before, frictionally engage the confronting walls of the grooves and virtually key the sleeve 24 in position. This frictional engagement is of a degree sufficient to tend to exclude oil and other liquid substances, but should oil eventually work past the ribs the springs 26 would still function to prevent the sleeve 24 from either turning or moving endwise with respect to the coupling 10. Those portions of the coupling 10 on each side of the protector 24 may be provided with roughened or knurled circumferential panels 27 provided for the better gripping of the coupling member.

Various changes in the size and shape of the different parts, as well as modifications and alterations, may be made within the scope of the appended claims.

What I claim, is:

1. In a tubular coupling, a coupling sleeve having boxes at each end and a plurality of circumferential grooves, a flexible mobile protector sleeve having internal ribs fitting in said grooves, and resilient means on said ribs engaging within said grooves.

2. A coupling having boxes at each end and a plurality of circumferential grooves, a flexible protector sleeve surrounding said coupling and having internal ribs fitting in said grooves, and annular coiled springs carried by said ribs and engaging said grooves to prevent rotation of said protector sleeve.

3. A tubular coupling, having pin receiving boxes at each end, said coupling having a plurality of circumferential grooves, a flexible protector sleeve shaped to fit about said coupling, a plurality of internal ribs on said sleeve, engaging within said grooves, and springs engaging between said ribs and grooves.

4. A coupling having a circumferential groove, a flexible protector sleeve applied to the coupling over the groove, said sleeve being of original sleeve form, outstanding means inherently on the sleeve engaging the groove to key the sleeve against endwise motions, and friction means partially embedded in said outstanding means engaging directly the surface of the groove.

5. A member having a circumferential groove, a protector sleeve on said member having a rib frictionally engaging the side walls of the groove, and metallic means embedded in the rib engaging the bottom of the groove to augment the frictional effect between said rib and side walls.

6. A member having a circumferential groove, a protector sleeve, a rib on said sleeve engaging the groove with a wedge action, and an element of a material dissimilar to that of the sleeve and rib, being partially embedded in the rib to leave an exposed portion for engagement with the bottom of the groove.

In testimony whereof I affix my signature.

GUSTAVUS A. MONTGOMERY.